United States Patent
Enzler et al.

(10) Patent No.: US 8,248,888 B1
(45) Date of Patent: *Aug. 21, 2012

(54) BOTTOM UP CONTACT TYPE ULTRASONIC CONTINUOUS LEVEL SENSOR

(75) Inventors: George W. Enzler, Mineola, NY (US); Glen D. Melder, Lake Ronkonkoma, NY (US)

(73) Assignee: Measurement Specialties, Inc., Hampton, VA (US)

( * ) Notice: Subject to any disclaimer, the term of this patent is extended or adjusted under 35 U.S.C. 154(b) by 77 days.

This patent is subject to a terminal disclaimer.

(21) Appl. No.: 12/850,248

(22) Filed: Aug. 4, 2010

(51) Int. Cl.
*G01S 15/00* (2006.01)
(52) U.S. Cl. .......................................................... 367/99
(58) Field of Classification Search ...................... 367/99
See application file for complete search history.

(56) References Cited

U.S. PATENT DOCUMENTS

| | | | |
|---|---|---|---|
| 5,119,676 A * | 6/1992 | Bower et al. ................. | 73/290 V |
| 6,585,763 B1 * | 7/2003 | Keilman et al. ............. | 623/1.42 |
| 8,061,196 B2 * | 11/2011 | Dam ............................ | 73/290 V |
| 2004/0123674 A1 * | 7/2004 | Moscaritolo et al. ....... | 73/861.27 |
| 2005/0262927 A1 * | 12/2005 | Scott ............................ | 73/64.53 |
| 2005/0284217 A1 * | 12/2005 | Miyagawa et al. .......... | 73/290 V |
| 2006/0241472 A1 * | 10/2006 | Osawa et al. ................ | 600/459 |
| 2006/0288775 A1 * | 12/2006 | Miyagawa et al. .......... | 73/290 V |
| 2008/0231267 A1 * | 9/2008 | Miyagawa et al. ......... | 324/207.25 |
| 2009/0009490 A1 * | 1/2009 | Yang ............................ | 345/179 |
| 2009/0038394 A1 | 2/2009 | Zachmann | |
| 2009/0044635 A1 * | 2/2009 | Allen .......................... | 73/861.18 |
| 2010/0132453 A1 * | 6/2010 | Dam ............................ | 73/290 V |

FOREIGN PATENT DOCUMENTS

| | | |
|---|---|---|
| JP | 11-153471 A | 6/1999 |
| JP | 2004-294073 A | 10/2004 |
| JP | 2004-340911 A | 12/2004 |
| RU | 2010180 C1 | 3/1994 |

* cited by examiner

*Primary Examiner* — Jack W Keith
*Assistant Examiner* — James Hulka
(74) *Attorney, Agent, or Firm* — Howard IP Law Group, PC

(57) ABSTRACT

An ultrasonic sensor for measuring the level of liquid in a vessel has an elongated tubular probe, a tube within the probe, and a transducer that converts electrical energy to ultrasonic energy mounted at or near one end of the tube to transmit ultrasonic energy along the probe longitudinal axis. A conical reflector that reflects ultrasonic energy is opposite the transducer ultrasonic energy emitting part to reflect ultrasonic energy received from the transducer upwardly in the probe to an air-liquid interface from which it is downwardly reflected to the conical reflector element that directs the energy reflected from the interface back to the transducer for conversion to an electrical signal that is used by an electronic module to measure the liquid level in the probe, which is the liquid level in the vessel, by measuring the round trip travel time of the ultrasonic signal energy.

9 Claims, 5 Drawing Sheets

BOTTOM UP CONTACT TYPE ULTRASONIC CONTINUOUS LEVEL SENSOR

FIELD OF THE INVENTION

The invention is directed to a bottom up ultrasonic sensor that provides continuous detection of liquid level within a vessel with a reduced dead zone of measurement at the vessel bottom.

BACKGROUND OF THE INVENTION

Ultrasonic sensors for continuously or intermittently measuring the level (height) of a liquid within a vessel are well known. The liquid can be of any type including different types of chemical and high purity liquids used in the manufacture of semiconductors. Such sensors have a transducer located close to the bottom wall of the vessel that transmits a beam of ultrasonic energy upwardly to the liquid surface. The sensor transducer is most often mounted at the bottom end of an elongated probe that extends within the vessel and that contains the liquid at the same height level as it is in the vessel. The ultrasonic energy is transmitted from the bottom end of the probe and is reflected from the liquid surface and received back at the transducer. The round trip transit time of the energy is measured from which the level of the liquid in the probe can be calculated. The measured level of the liquid in the probe will be that of the level in the vessel.

FIG. 1 shows the construction of a typical prior art bottom-up liquid contact type sensor of the type discussed above. There is a vessel 12 of a material that is compatible with the liquid 14 that it contains. The vessel 12 can be of any height and diameter as needed for the application that it serves and has a top wall 16 on which a header 19 of the ultrasonic sensor 20 is mounted. The mounting arrangement shown is illustrative and the sensor 20 can be suspended from the top edge of the vessel or otherwise mounted. A probe 22 of the sensor extends downward from the header 19 into the vessel. The probe 22 is most often a cylindrical tube of a material that is compatible with the liquid 14. Stainless steel is suitable probe material for many applications although probes of different types of plastic also are used. The probe 22 has a vent hole 23 near its upper end somewhat below the vessel top wall 16.

An inner tube 24 also is suspended from the header 19 and extends somewhat past the lower end of the probe 22. The tube 24 also can be of stainless steel or plastic. A housing 27, typically of plastic such as an epoxy, that contains a transducer element 26 is attached to and seals the lower end of tube 24. Transducer 26 usually is of a piezoelectric ceramic material such as PZT (lead-zirconate-titanate). There is a space 21 between the housing 27 and the lower end of probe 22 so that the vessel liquid 14 can enter the probe 22 and rise to the same level as the liquid in the vessel. Wires 30 extend from an electronic module 34 outside of the vessel, through the header 19 and within the tube 24 to the transducer 26 in housing 27.

The electronic module 34, which also can be mounted on the header 19, contains the necessary conventional components and circuits to provide pulses or bursts of electrical energy signals to the transducer 26. The transducer converts the electrical energy signals into ultrasonic (electro-mechanical) energy and transmits this energy upwardly (vertically as shown in FIG. 1) in the probe 22 toward the header 19. The upwardly transmitted ultrasonic energy is reflected from the interface of the liquid 14 and air, or other gas, in the probe downwardly back to the transducer 26 which converts the received ultrasonic energy back into electrical energy signals that are supplied to the electronics module 34. The circuits in the electronics module 34 include an amplifier and an analog to digital for the received signal. There also is a microprocessor that controls production of periodic pulses or bursts of pulses of electrical energy signals by a power amplifier that are supplied to the transducer 26. The microprocessor also computes the round trip time of the transmitted and received reflected ultrasonic energy in the probe 22 and from this calculates the level of the liquid in the probe 22, which is the level of the liquid in the vessel 12. The electronics module 34 also can have a display which reads out the level measured. The module 34 also can transmit measurement information to another device such as a control circuit that turns a supply of liquid to the vessel on and off, sounds an alarm or gives some other indication.

While the prior art sensor 20 of FIG. 1 is operative, it has several disadvantages. In a typical sensor the housing 27 requires a minimum height of ⅜" to ½ " to encapsulate the transducer 26. This means that the level of the liquid 14 in the vessel cannot be measured below the housing height. Sometimes the vessel is constructed with a well below its bottom wall into which the housing 27 can extend to eliminate the measuring problem caused by the housing height. But this adds expense in the construction of the vessel and can make its mounting more difficult. Also if liquid stays on the top portion of housing 27 which encapsulate the transducer 26 the ultrasonic received signal reverberates many times within the liquid and the reverberated ultrasonic signal can cause false indications. Another disadvantage is that a characteristic of PZT material is such that it "rings" when an energy pulse or burst of pulses is applied to it. The ringing time is as long as 30/40 microseconds. Because of the ringing, as the transducer transmits energy in a direction vertically upward along the probe longitudinal axis a "dead zone" occurs between the upper end of the transducer housing 27 and a point within the probe 22. The duration of the transducer ringing does not allow level measurement in the "dead zone", which can of a height as large as ¾" to 1"

Because of the problems described above the prior art sensor 20 is unable to measure the liquid level to or close to the bottom of the vessel. A solution to this problem is found in U.S. patent application Ser. No. 12/315,149, filed on Dec. 1, 2008, now U.S. Pat. No. 8,061,196 granted Nov. 22, 2011 which is assigned to the assignee of this application and patent thereof and whose disclosure is incorporated herein by reference. The invention of that application uses a tube within the probe and a transducer mounted at or near the lower end of the tube that converts electrical energy signals to ultrasonic energy. The transducer is mounted to the tube in a manner such that it transmits ultrasonic energy horizontally across the probe and generally transverse to the probe longitudinal axis instead of vertically as in the prior art sensor of FIG. 1. An element having a surface that reflects ultrasonic energy is mounted on the probe at an angle, preferably of about 45°, to the probe longitudinal axis and opposite to an ultrasonic energy emitting and receiving part of the transducer. The angled reflector element receives the ultrasonic energy transmitted horizontally in the liquid in the probe by the transducer and directs it upwardly within the probe to the air-liquid interface. The reflector element receives the energy reflected downwardly from the interface and directs it back to the transducer for conversion to an electrical signal that is used by the electronics module to measure the ultrasonic energy round trip travel time and from this to calculate the probe, and thereby the vessel, liquid level.

The sensor of the prior application eliminates the problems of prior art sensors, such as in FIG. 1 since no transducer housing is needed that extends from an end of the tube below the probe. This eliminates the need for a well at the vessel bottom. The sensor of the prior application also reduces the dead zone caused by transducer ringing since the ultrasonic energy is transmitted horizontally, transverse to the probe longitudinal axis, and parallel to the liquid surface instead of vertically upward as in the prior art sensor. This sensor of the prior application can provide as small as a ¼" dead zone.

The sensor of the prior application is fully operative and useful. As with most instruments, it is desired to provide improvements. The present invention is directed to such an improvement over the sensor of the prior application.

BRIEF DESCRIPTION OF THE INVENTION

In accordance with the invention an ultrasonic bottom up sensor for measuring the level of liquid in a vessel has an elongated tubular probe extending into the vessel. A tube is within the probe and a transducer that converts electrical energy to ultrasonic energy is mounted on a plate that seals the tube at or near its lower end above the lower end of the probe. Wires are within the sealed tube to convey electrical energy signals from an electronics module to the transducer and from the transducer back to the electronics module.

A cap having an internal generally conical reflector is mounted at the end of the probe. In a preferred embodiment of the invention, the cap has openings to admit the vessel liquid into the probe. The transducer is mounted to the tube to transmit ultrasonic energy signals vertically down toward the conical shaped reflector. As compared to the substantially single point type of transmission of ultrasonic energy and collection of the reflected energy from the air—liquid interface provided by the reflector of the prior application, the reflector of the invention has a substantially 360° coverage. This redirects the energy receive from the transducer vertically upward to the air—liquid interface from which it is reflected back to the reflector. The reflector focuses the collected energy reflected from the interface onto the transducer for conversion to an electrical signal that is used by the electronics module to measure the ultrasonic energy round trip travel time and from this to calculate the vessel liquid level in the probe and thereby the level in the vessel.

The sensor of the application eliminates the problems of prior art sensors and is an improvement over the sensor of the prior application. The conical design of the reflector provides greater sensitivity because the transmission and reception of the reflected received ultrasonic energy is over a surface of the 360° instead of a single point as in the sensor of the prior application. This is useful for measurements in liquids of high viscosity. The sensor also allows for the use of a separate transducer crystal for liquid density and temperature compensation measurement without interfering with the measurement made by a main liquid level sensing crystal. This sensor provides a dead zone of ¼" and less.

BRIEF DESCRIPTION OF THE DRAWINGS

Other objects and advantages of the present invention will become more apparent upon reference to the specification and the annexed drawings in which.

DETAILED DESCRIPTION OF THE INVENTION

Figure 1:
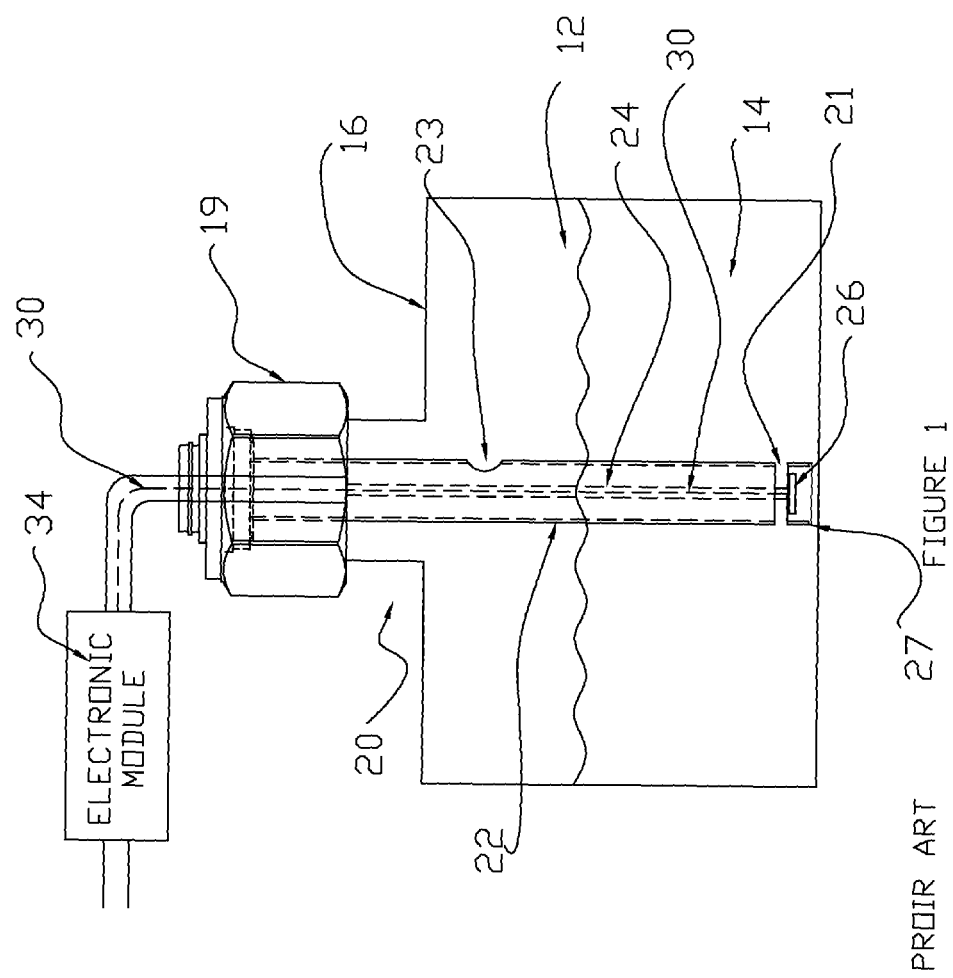
FIG. 1 shows a prior art sensor.
Figure 2:
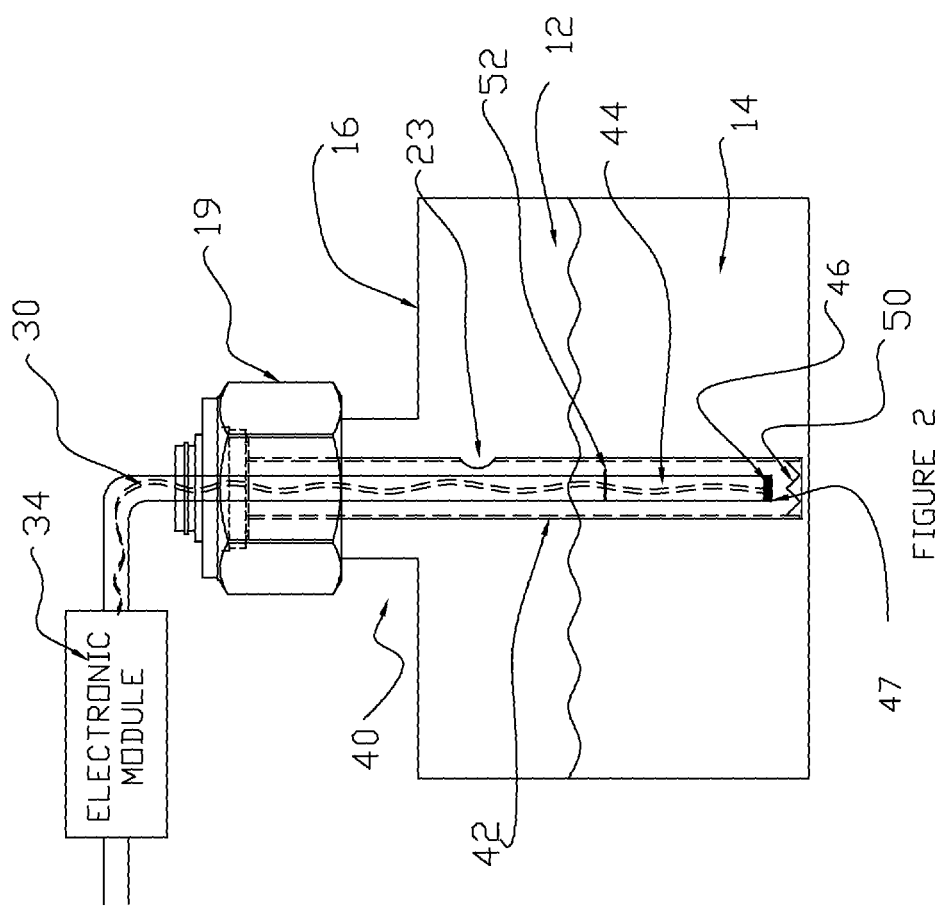
FIG. 2 shows a sensor design of the invention in a partial cross section view.
Figure 3A:
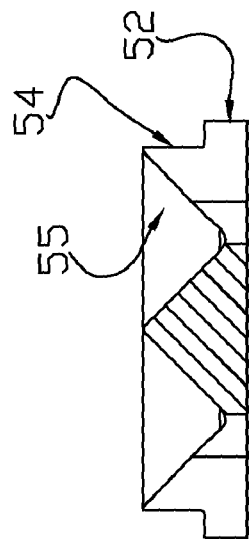
FIG. 3 is a perspective view of the reflector cap and FIGS. 3A and 3B are cross-sectional views of the cap along lines A-A and B-B of FIG. 3.
Figure 3B:
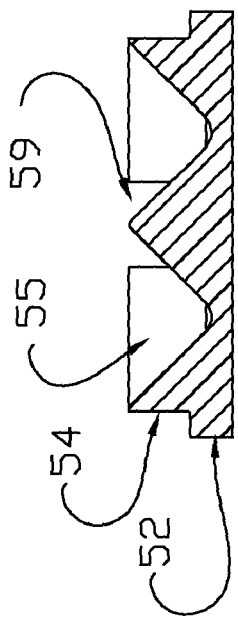
Figure 3:
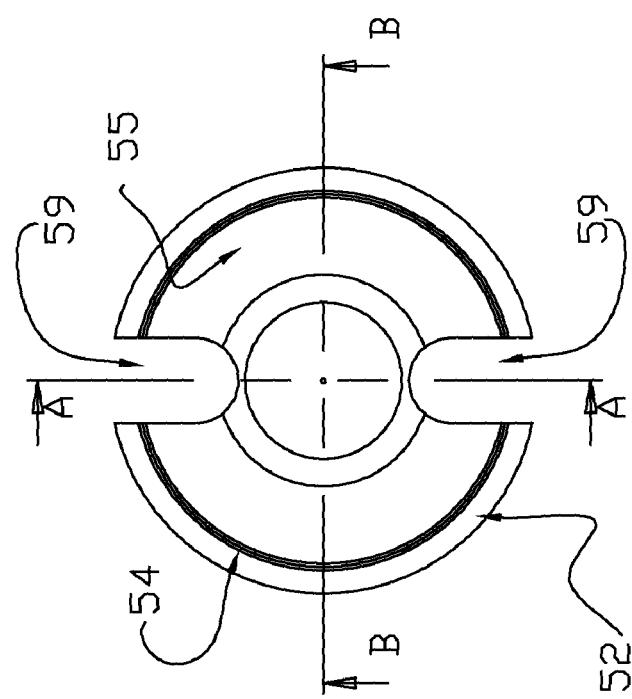

Referring to FIGS. 2 and 3, the same reference numbers are used for the same components as in FIG. 1. Here also there is vessel 12 having a top wall 16 that contains a liquid 14. A sensor 40 has a hollow tubular probe 42 suspended within the vessel from the header 19 mounted to the vessel top wall 16. The probe 42 is of any suitable material such as stainless steel or plastic and can be suspended in the vessel liquid by any suitable mounting arrangement. The probe 42 also has a vent hole 23.

A tube 44 extends from the header 19 within probe 42. The tube 44 also can be attached to an inner wall of the probe 42 by suitable spacers or supports. The tube 44 also is of a suitable material such as stainless steel or plastic.

A transducer 46, preferably a PZT (lead-zirconate-titanate) or PVDF (polyvinylidene fluoride) piezoelectric crystal, is in or on a housing 47 or plate that is mounted to tube 44 near its lower end. The transducer housing or plate 47, which is of a material such as a plastic or an epoxy, is mounted to the wall of tube 44 at its end which is above the end of probe 44 and seals the tube end. The transducer 46 emits energy vertically downwardly toward the lower end of probe 42. Wires (not shown) are within tube 44 having ends connected to the electrodes (not shown) of transducer 46. The wires extend in the tube 44 through the header 19 to the electronic control unit module 34.

A reflector cap 50, shown in FIG. 3, is at the bottom end of the probe 42. The cap 50 has a shape that corresponds to that of the internal shape of the probe, both illustratively shown as being circular. The cap preferably is of stainless steel and has a base with a rim 52 having a diameter equal or greater to that of the probe. There also is a raised reflector part 54 on the base rim having an outer diameter equal to that of the probe inner diameter. Thus, the reflector part 54 of the cap can fit into the lower end of the probe below the transducer 46. The cap base rim 54 engages the probe wall and is held to the probe by a press fit, an adhesive, or by welding. Cross-sections of the cap 50 along lines A-A and B-B of FIG. 3 are shown in FIGS. 3A and 3B, respectively.

The cap reflector part 54 has an internal generally conical shaped reflector surface 55 with a flat generally central section 56. The center of the energy emitting face of the transducer 46 preferably is aligned with the center of the reflector 55. The reflector surface 55 of substantially 360°, is polished so that it can reflect ultrasonic energy from and to the transducer 46. Opposed openings 59 are cut in the cap base rim 52 and through a portion of the reflector part 54 to allow the liquid to enter the probe interior.

Figure 4A:
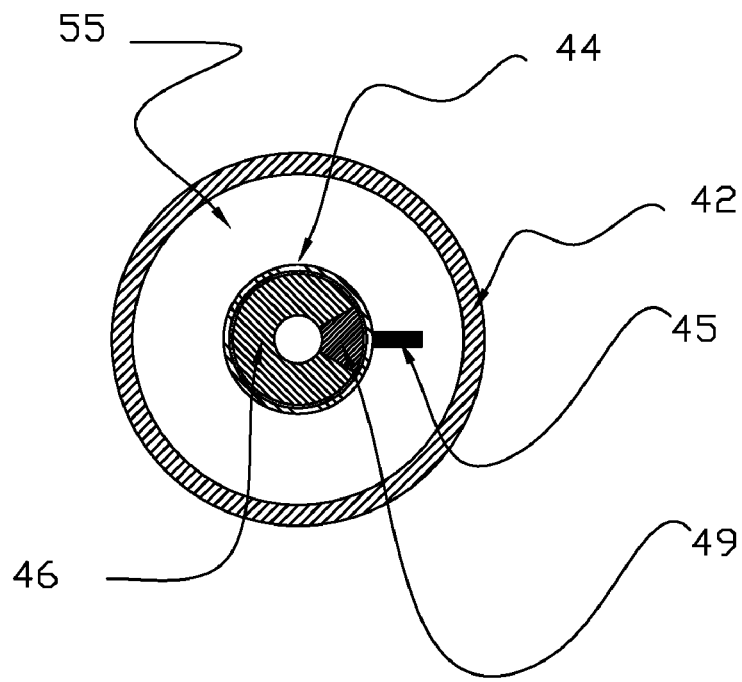
FIG. 4A is a top plan view of the probe and tube of FIG. 4.
Figure 4:
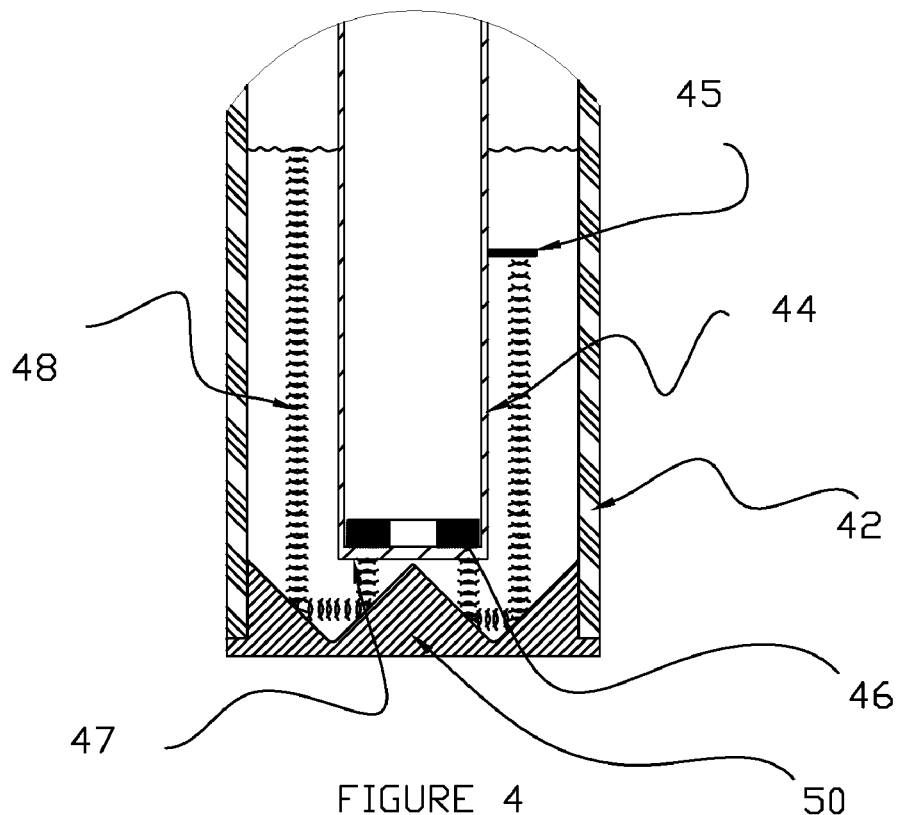
FIG. 4 is an enlarged view of the lower end of the probe and tube of the sensor of FIG. 2.

FIGS. 4 and 4A show enlarged cross-sectional views of an embodiment of the sensor with the reflector cap 50 cross-section being that of FIG. 3B. As seen in FIG. 4A, the transducer 46 is generally donut shaped with an open sector 49 substantially centered on a reflecting pin 45 that is attached to the outer surface of the probe 42 by a known fixed distance from the reflector surface 55. The purpose of the reflector pin 45 is described below.

In the operation of the sensor of FIGS. 3 and 4 a microprocessor in the electronics module controls production of an electrical energy signal pulse or burst of pulses from a power amplifier to the transducer 46 which converts these pulses into pulses of ultrasonic energy. As shown by the signal symbols 48, the ultrasonic energy pulses pass generally vertically from the transducer 46 through the liquid in the probe 42 interior to the conical reflector 55. The ultrasonic energy that strikes the center of the conical reflector 55 is reflected upwardly in the liquid in probe 42 along its longitudinal axis and substantially 360° around the outside of the tube 44 to the air-liquid interface within the probe. The ultrasonic energy that impinges on the interface is reflected downwardly in the probe back to the conical reflector 55. The downwardly reflected ultrasonic energy from the liquid-air interface strikes the conical reflector element 55 which focuses it and returns it though the liquid in the probe to the transducer 46.

The ultrasonic energy received by the transducer 46 is converted to electrical energy signals which are conveyed by the wires in tube 44 to the electronic module 34. The module 34 can have an amplifier for the received signals and an analog to digital converter to process the amplified received signals into digital form for application to the microprocessor in the electronics module. The microprocessor calculates the liquid level in the probe 42 by measuring the round trip transit time of the ultrasonic energy signals thereby to calculate the liquid level in the probe 42 which will be the vessel liquid level.

A problem arises in the accuracy of sensors due to the change of ultrasonic energy velocity in the liquid. This is caused by various external factors, such as temperature, or internal factors such as viscosity of the liquid. When the velocity of the energy changes due to such internal or external factors, the measured round trip time of the ultrasonic energy in the probe is not an accurate measurement of liquid level, or interface height, in the vessel. It therefore becomes desirable to provide an arrangement to compensate for such change of internal or external factors to provide a correction to round trip travel time measurement. To overcome this problem an optional reflective pin 45 is installed on the exterior of the tube 44 at a fixed known and calibrated distance from transducer 46 to the reflector 55 plus from the reflector 55 to the reflector pin 45 to compensate for the above mentions effect. That is, the distance from the transducer to the pin 45 is known and the microprocessor in the electronic module uses the measured round trip time of ultrasonic energy from the transducer 46 to the pin 45 and back to adjust computation of the liquid level measured for variation such as caused by changes in temperature. The microprocessor can alternately make measurements of the round trip travel times to and from the air-liquid interface and to and from the pin. In the embodiment of the transducer shown in FIG. 4A the open section 49 somewhat reduces cross talk with the main liquid level measurement that takes place.

Figure 5:
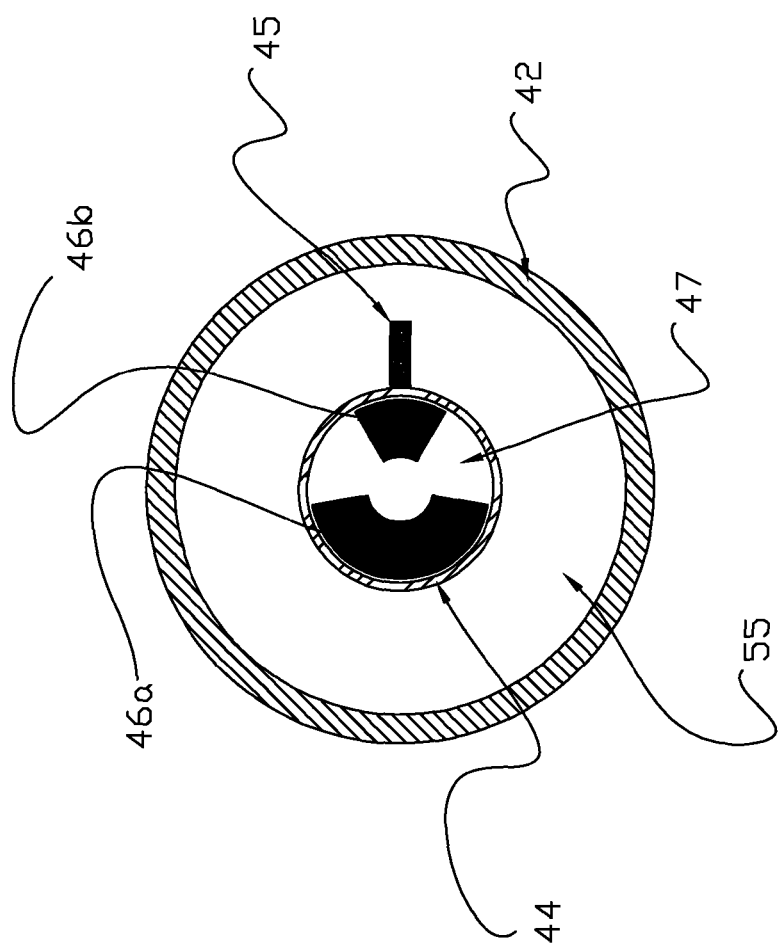
FIG. 5 is a top plan view of the probe and tube of FIG. 5 showing another type of transducer.

FIG. 5 shows a further embodiment of the transducer 46 that is made in two part circular sections 46a and 46b that are mounted on the base plate 47 that seals the end of the tube 44. Sector 46a is somewhat less than 180° and sector 46b about 45°. These values are approximate. The difference between the transducers of FIGS. 4 and 5 is that the transducer sector 46b is aligned substantially with the center of the reflector pin 45. In this embodiment of the invention it is preferred that the microprocessor in the electronics module 34 alternately activate and use the transducer sectors 46a and 46b to make measurements of the liquid level in the probe and the round-trip time to the reflecting pin 45. The electronics module 34 has the necessary components, such as a multiplexor, for making the alternate measurements by alternately operating the two transducer sectors. The presence of the transducer sector 46b better focus is the energy on the reflector pin 45.

The sensor of the invention has a number of advantages. The dead zone can be less than ¼" because the duration of the transducer ringing is less than the time the energy travels from the transducer to the reflector. Since the transmission and reception of the ultrasonic energy takes place over substantially 360° the sensor is more sensitive and allows the measurement of liquid levels high viscosity liquid liquids. The conical design of the reflector allows for two separate crystal design, one for main liquid level measurement and the other for compensation due to the density and temperature of the liquid.

Specific features of the invention are shown in one or more of the drawings for convenience only, as each feature may be combined with other features in accordance with the invention. Alternative embodiments will be recognized by those skilled in the art and are intended to be included within the scope of the claims. Accordingly, the above description should be construed as illustrating and not limiting the scope of the invention. All such obvious changes and modifications are within the patented scope of the appended claims.

We claim:

1. A contact type ultrasonic bottom up sensor to measure the level of liquid in a vessel, comprising:
    an elongated tubular probe having an end to be located near the vessel bottom and an opening though which the vessel liquid can enter the probe interior;
    a tube within said probe having an end spaced from said end of said probe;
    a transducer that converts electrical energy signals to ultrasonic energy mounted at or near said end of said tube to transmit and receive ultrasonic energy though liquid in the probe in directions generally along the probe longitudinal axis; and
    a generally conical shaped reflector at said end of said probe opposing said transducer having first and second opposing surfaces that reflects ultrasonic energy, said reflector first surface being opposite to an ultrasonic energy emitting and receiving part of said transducer to reflect ultrasonic energy transmitted downwardly from said transducer within said probe to said reflector second surface which directs the ultrasonic energy reflected from said reflector first surface upwardly to an air-liquid interface in the probe from which it is directed downwardly back to said reflector second surface and reflected to said reflector first surface from which the energy reflected from the interface is reflected upwardly back to said transducer for conversion to an electrical signal to be used for measuring the round-trip travel time of the ultrasonic energy from said transducer to the air liquid interface within the probe.

2. The sensor as claimed in claim 1 further comprising a cap having said reflector that is mounted at said end of said probe to mount said reflector first surface within said probe opposite an ultrasonic energy transmitting and receiving part of said transducer.

3. The sensor as claimed in claim 1 and further comprising an electronics module that supplies electrical signals to said transducer for conversion to ultrasonic energy and uses the supplied electrical signals and signals returned from said transducer after reflection from the liquid-air interface in the probe to measure the round trip travel time of the ultrasonic energy in the liquid in said probe.

4. The sensor as claimed in claim 1 further comprising a member on which said transducer is mounted and which said member seals the end of said tube.

5. The sensor as claimed in claim 4 wherein said cap has openings to admit liquid into the probe interior.

6. The sensor as claimed in claim 1 wherein each of said reflector first and second surfaces is flat and said surfaces are connected in has a generally conical V shape.

7. The sensor as claimed in claim 1 and further comprising a pin reflective to ultrasonic energy mounted within said probe at a fixed distance from said transducer, wherein ultrasonic energy transmitted by said transducer to said reflector first surface is reflected to said reflector second surface and then to said pin from which it is reflected back to said reflector second surface from which it is reflected to said reflector second surface and is directed back to said transducer to be used to measure the round-trip transit time of the ultrasonic energy from said transducer to said pin.

8. The sensor as claimed in claim 7 wherein said transducer has two sectors, one said sector being substantially aligned with said pin.

9. The sensor as claimed in claim 8 and further comprising an electronics module that supplies electrical signals to said two sectors of said transducer for conversion to ultrasonic energy and uses the respectively supplied electrical signals and signals returned from each of said two transducer sectors after reflection respectively from the said pin and the liquid-air interface in the probe to measure the round trip travel time of the ultrasonic energy to said pin and in the liquid in said probe to the air-liquid interface.

\* \* \* \* \*